3,335,551
DEVICE FOR PURIFYING A GASEOUS STREAM
Fernand Golay, Geneva, Switzerland, assignor to
Minotaure S.a.r.l., Rolle, Switzerland
Filed Nov. 1, 1965, Ser. No. 505,819
Claims priority, application Switzerland, Dec. 11, 1964,
16,054/64
2 Claims. (Cl. 55—237)

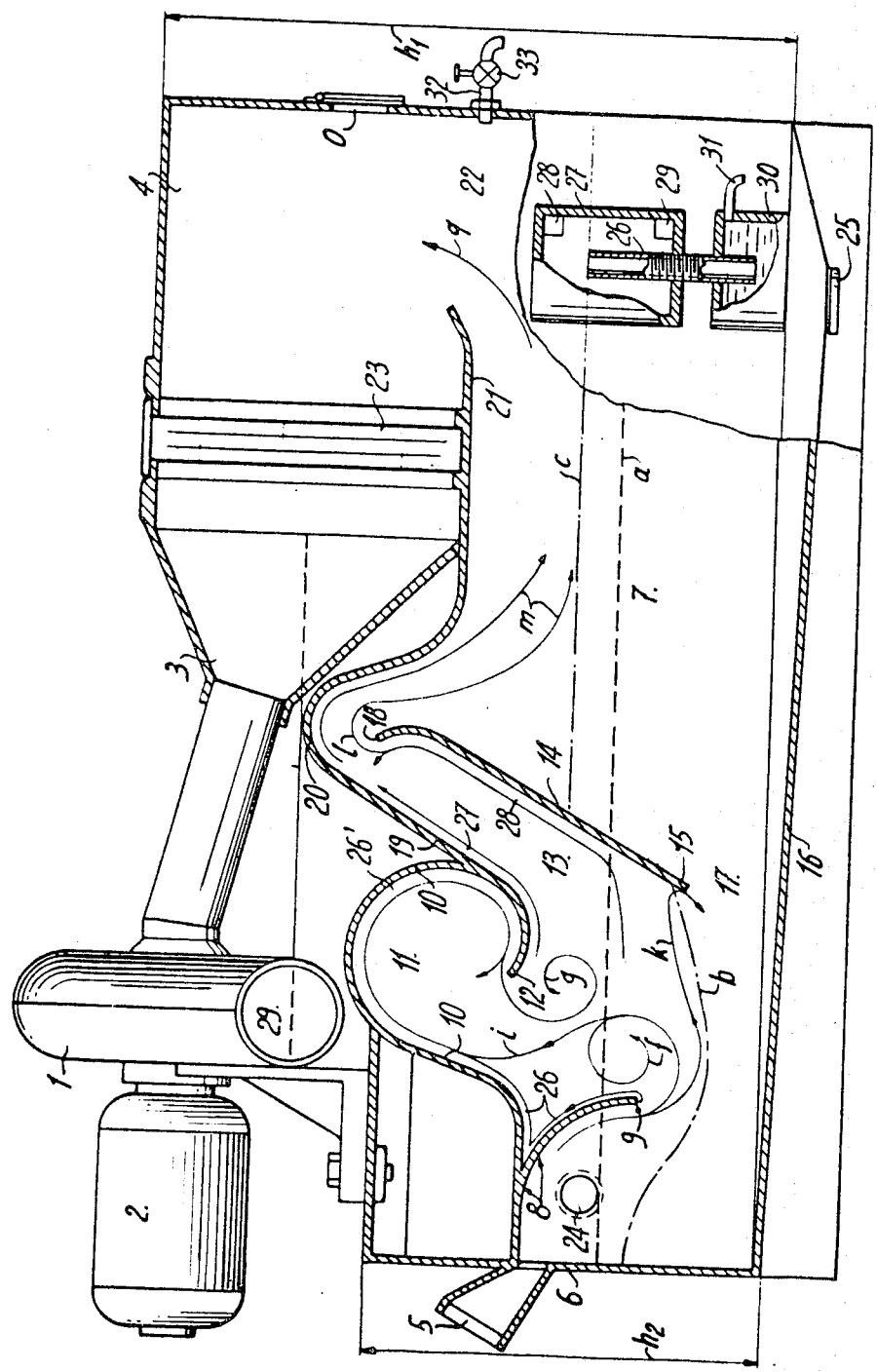

Various types of purifying devices are in existence and in particular dust separators using either filtering cells, purifying by bubbling a gaseous stream in a liquid or by centrifugal separation. However, most separating devices in existence undergo a severe loss of pressure when operating efficiently to remove dust. This is accompanied by an excessive expenditure in energy and by a reduction in the volume of air treated by a given power in a given unit of time.

The present invention has for an object a purifying device for a gaseous stream which tends to avoid the above cited drawbacks by projecting approximately perpendicularly a gaseous current against a liquid surface, by causing a part of said liquid to be carried by the gaseous stream into at least one area of strong turbulence having at least two vortexes of opposite directions, and which inter-penetrate in such a way as to wet all the particles in suspension in the gas and that at least one rapidly and circular exhaust of the gaseous stream is effected in such a way as to occasion an additional purifying by centrifugal action.

The present invention tends to avoid the previously cited drawbacks and also has for object a purifying device for gaseous stream having a pump for aspirating a gaseous stream to be purified through a purifying vat partially filled with liquid characterised by the fact that said separation vat has an inlet for the gaseous stream to be purified, a purified, a deflector directing the gaseous stream entering into the vat approximately perpendicularly to the surface of the liquid, and extending transversely along the entire width of the separating vat, the lower edge of which forms the primer for a first vortex; a concave surface located above and downstream from the deflector and extending also transversely along the entire width of the separating vat and having a free edge constituting the primer for a second vortex having a opposite direction to that of said vortex; the edge of said deflector and the free edge of the concave surface being sufficiently near one to the other so that the two vortexes thus created penetrate one another and create a very high turbulence for the gaseous stream and for the liquid entrained by the latter and thereafter wet all the particles borne by this gaseous stream the device having also a channel inclined towards the upper part downstream of the separating vat and extending transversely along the entire width of this vat said channel being formed by a first wall having a lower part located near the bottom of the separating vat for retaining the turbulence of the current and of the liquid in the upstream part of the vat its upper extremity turned back upstream to prime a third vortex and by a second wall substantially parallel to the first and having a lower part coinciding with the said concave surface, and an upper part surrounding the upper part of the first wall and extending downwardly for a certain distance, the channel being thus linked to an outlet of the separting vat.

The figure in the annexed drawing shows schematically in partial cross-section and by way of example, one embodiment of a purifying device for a gaseous stream.

The purifying device shown comprises a pump consisting of a ventilator 1 driven by means of an electric motor 2, the aspirating side of which is linked to an outlet 3 of separating vat 4. In the embodiment shown in the pump is secured directly on the upper part of said vat 4.

The separating vat 4, as seen from above, has a generally rectangular shape and has a down stream part 1 higher ($H_1$) than that ($H_2$) of its upstream part. This separating vat also has an inlet 5 for the gaseous stream to be purified located in its upstream frontal surface 6 as well as a labyrinth which permits to obtain, during passage of the gaseous stream therethrough, a good wetting of the particles suspended in this stream by a liquid 7 disposed in the vat 4 to efficiently purify the gaseous stream.

This labyrinth has a deflector 8, extending transversely along the entire width of the separating vat 4, and incurved full at the bottom for directing the gaseous stream to be purified along a direction perpendicular to the level of the liquid contained in vat 4. The lower edge 9 of this deflector 8 forms the primer for a first vortex for the gaseous stream. In the embodiment shown, this deflector has a parabolic curvature, however other shapes of curves may be envisaged without departing from the claimed scope of protection.

This labyrinth additionally has a concave surface 10 extending transversely along all the width of the separating vat 4, and the upstream part of which is linked to deflector 8 while the downstream part forms a cylindrical cavity 11. This concave surface 10 is located slightly above and upstream from the deflector. The free edge 12 of this concave surface 10 constitutes the primer for a second vortex for the gaseous stream. This free edge 12 is sufficiently near edge 9 of the deflector 8 so that the vortexes thus formed inter-penetrate. The curvature on the concave surface 10 in the region of cavity 11 is practically constant and forms an approximately cylindrical surface. However, the last part, near the free edge 12, of this surface has a radius of curvature smaller than its other parts.

Finally, the labyrinth comprises another channel 13 inclined upwardly and downstream from the separating vat 4. This channel is formed by a first inclined wall 14 extending transversely along the entire width of the vat 4, and of which the lower part 15 is located immediately near the bottom 16 of vat 4, at a level lower than that of edge 9 of the deflector but allowing however a passage 17 between the upstream part and the downstream part of vat 4 between said bottom 16 and lower part 15. The upper part of the first wall 14 is slightly bent back upstream of the vat and is located at a level approximately equal to that of the upper part of cavity 11. The extremity 18 of this upper part of wall 14 forms the primer of a third vortex for the gaseous stream.

This canal is additionally formed by a second wall 19, extending practically parallel to the first wall 14 also along the entire length of vat 4, the upstream or lower part of which coincides with the free edge 12 of concave surface 10. The upper part 20 of this wall 19 surrounds the upper part 18 of the first wall 14 and is located at the level higher to that of the upper part of cavity 11. This second wall extends upstream from vat 4 and is inclined downwardly. The downstream part of the separation vat is delimited upwardly by a baffle or upper wall 21. Finally, a passage 22 is provided between a free edge downstream from the baffle 21 and the frontal rear face of vat 4. This passageway 22 gives access to a filter element 23 extending transversely along the entire width of vat 4 and located between the upper face of baffle 21 and the upper wall 24 of vat 4. This filtering element 23 separates the separting vat proper from its outlet 3. In modifications of the invention, this filter element may be eliminated, the cleaning action taking place in the separating vat itself.

The separating vat 4 has an overflow outlet 24 which determines the level of liquid when the device is not functioning, that is to say, the amount of liquid introduced in vat 4. Additionally, the bottom 16 of the vat is slightly inclined toward the back and has a lower point provided with a draining opening 25 permitting the removal of liquid and of the mud accumulated in the vat.

In order to limit the level of water in the downstream part of the separating vat during functioning of the cleaning device, a syphon box is provided. This syphon box comprises a channel 26 externally threaded and screwed vertically in a box 27 mounted in impervious fashion on the lateral face of the separating vat. This box 27 communicates directly with the separating vat through two openings 28 and 29 located on either side of the operative level of the liquid in the downstream part of the separating vat. The upper end of canal 26 is adjusted to the level of functioning $c$ desired while the lower end of this canal 26 plunges deeply in a vessel 30 full of water and provided with outlet 31.

An inlet pipe for water 32 controlled by a gate 33 permits to fill the separating vat and to constantly adjust the level $c$, of the liquid in the separating vat. Practical tests have shown that this device will absorb very considerable quantities of dust and particles contained in an airstream passing therethrough. For example, in one minute, there was introduced 3 litres of sawdust and wooddust through inlet 5 of the vat of a device having a capacity of the order of 2 cubic litres per minute. All these particles were retained without difficulty by the device. The same experiment was repeated with sand blasting dust and the same result was observed. The result of this operation is very interesting because the suspended dust remains on the surface of water and the fine particles deposit on the bottom of the vat. At no time can these materials obstruct the good-functioning of the machine. This is remarkable for most devices in existence require a pressure differential much greater than that necessary in the present device and are incapable, without clogging, of treating equal amounts of dust introduced so rapidly. The operation of the claimed device is as follows:

The user introduces water, either by inlet 5, or by opening O specially provided for this purpose or by conduit 32 by actuating gate 33 in the vat until the level $a$ defined by the overflow 24 is obtained. Then the user start motor 2 driving ventilator 1 which has for effect to create an air draught across the separating vat 4 and filter element 23. This air current behaves in the following manner in the separating vat:

The air or the gas to be purified sucked by pump 1, 2 and entering in the separating vat by inlet 5 is directed downwardly by deflector 8 and is directed perpendicularly to the surface of liquid 7. Under the effect of this air pressure, the liquid level is pushed back and assumes a shape given by the line $b$ between the frontal face of vat 4 and lower part 15 of the first wall 14 of canal 13 of the labyrinth. The air stream projected against the liquid carries a part thereof in its movement and escapes from deflector 8 by passing under its edge 9. This edge 9 creates a first vortex $f$ causing an intimate mixture of water and air which has for effect to wet all the solid or liquid particles contained in the air stream.

Moreover, this vortex $f$ has for effect to form a cavitation behind deflector 8 and to create a vacuum in cavity 11 in such a way that a stream of water 26 is driven at high speed along the back surface of deflector 8 then along concave surface 10. A part 1 of vortex $f$ is also sucked in cavity 11 and joins the stream of water 26 to form a layer 26' of water moving at high speed along concave surface 10. This water contains a large part of the particles contained in the air stream and transporting the latter.

When this layer of water 26' reaches the free edge 12 of said concave surface, the latter creates a second vortex $g$. Owing to the fact that this free edge is located sufficiently close, approximately at an equal distance from the diameter of cavity 11, from edge 9 of the deflector, this second vortex $g$ inter-penetrates the first vortex $f$ and creates a very violent turbulence in the space comprised between this edge 9, free edge 12 and the lower part 15 of wall 14. This violent turbulence occasions the complete wetting of all the particles contained in the air stream. It should also be noted that cavity 11 only has one opening serving simultaneously for the entrance in this cavity of the mixture of air and water as well as for the exit of this mixture outside cavity 11. Upon passing this opening, the oppositely directed streams are intimately juxtaposed which permits the reaction of an additional turbulence and brings about an untimely wetting of all the particles contained in the air stream.

Moreover, the air driven into cavity 11 in a rotary movement at high speed is again purified by centrifugal action during its passing into this cavity 11. In effect, under the influence of centrifugal force, the heavier-than-air particles are projected in the liquid layer 26' and taken off by it. Furthermore, another part $k$ of the first vortex $f$ is projected against the lower part 15 of wall 15 and is pushed back into the liquid in the upstream part of the separating vat thus provoking an additional increase in the turbulence existing in the space between the deflector 8, the cavity 11, channel 13, and the lower part 15 of wall 14 of said canal 13.

The free edge 12 of concave surface 10 creates the cavitation on the back of concave surface 10 which forms the lower part of the second wall 19 of channel 13. This cavitation has for effect to drive at great speed a film of water 27 along the second wall 19. The sucking of the pump forces the wet air and the water across channel 13 in such a way that part of the vortexes $f$ and $g$ are sucked into the canal and a film of water 28 is driven along wall 14. When this film of water reaches the upper part 18 of wall 14, it is violently hurled against a stream of water 27 and provokes a violent turbulence and a third vortex $b$ around said upper wall of wall 14.

The air stream located at the centre of channel 13 is thus, once again, intimately mixed with water and drained by the third vortex. Moreover, a second centrifugal purification, analogous to that taking place in cavity 11, occurs in the upper part 20 of wall 14.

The air stream and the water driven thereby open then into the downstream part of the separating vat. The water $m$ loaded with all the particles previously contained in the air flows back into the bottom of vat 4 where the level $c$ is slightly raised. The purified air 9 on the other hand reaches filtering element 23 across passage 22 to be finally delivered to exit 29 of the pump.

The principle advantages of the claimed device are the following:

(1) The elimination of the danger of fire owing to the fact that the particles, which might be inflammable, are intimately mixed with water.

(2) The efficiency is superior to that of known devices.

(3) The water or liquid consumption is low, it suffices to replace the evaporated water.

(4) The device allows the retention of all dusts or particles in suspension in a gaseous stream such as fibrous dust, plastic dust, wood dust, saw dust, polishing residue, cloth residue and felt etc. Furthermore, the device permits the retention of the liquid particles of sususpensions for example, of paint, of oil, etc.

(5) The dusts and wastes do not adhere to the walls of the vat and cannot dirty the labyrinth owing to the strong turbulence and high speed of the water and the gas. The loss of pressure does not therefore increase in proportion to the time of use of the device.

(6) The up-keep of the device is limited to the removal of the mud which deposits in the downstream part of the vat either on the surface of the water for light dusts or on the bottom for the heavier materials. Moreover, the large size of the vat provided for these materials decreases the frequency of drainage.

(7) The dry filter element is inter-changeable and readily available. In a variant this filter can consist of an electro-static filter.

(8) The device can be designed for treating 100 cubic meters to 50,000 cubic meters per hour.

(9) The economy realised by comparison with known installations is of the order of 30 to 50 percent with repect to installation costs and from 20 to 30 percent on the cost of exploitation.

One embodiment has been described by way of example but it is understood that many variants may be provided without departing from the scope of the present invention.

What is claimed is:

1. In an apparatus for separating solid particles from a gas stream of the type having a horizontally-disposed pump aspirating the stream to be treated through a vat partially filled with liquid, having an inlet and an outlet; a downstream side and an upstream side;
   (A) deflecting means for directing said stream approximately perpendicularly to the surface of said liquid having first vortex-forming means for priming a first vortex; said deflecting means extending transversally along substantially the entire width of said vat and having an incurved lower portion having an extremity constituting said first vortex forming means;
   (B) a concave surface positioned above and downstream from said deflecting means, said surface having second vortex-forming means for priming a second vortex having a direction opposite to said first vortex;
   (C) said first and second vortex-forming means being so spaced apart to permit the interpenetration of the resulting vortexes; and thereby impart strong turbulence to said stream and to liquid carried thereby;
   (D) a channel upwardly inclined toward said downstream side of said vat and extending transversely along the width of said vat; said channel comprising a first wall having a lower portion serving to maintain in a turbulent state said gas and said liquid in said upstream part of said vat, said wall having an upper portion bent back toward the upstream side of said vat to prime a third vortex, and a second wall substantially parallel to said first wall and having a lower section merging with the lower section of said concave surface and an upper section substantialy surrounding said first wall, said channel communicating with said outlet of said vat.

2. Apparatus according to claim 1, wherein said concave surface extends transversally across the entire length of said vat and has a free extremity constituting said second vortex forming means.

References Cited

UNITED STATES PATENTS

| 2,536,998 | 1/1951 | Newcomb et al. | 55—223 |
| 2,546,259 | 3/1951 | Fenn | 55—223 |
| 3,018,847 | 1/1962 | Stanley | 55—241 |

FOREIGN PATENTS

| 623,259 | 3/1949 | Great Britain. |
| 866,770 | 3/1961 | Great Britain. |

REUBEN FRIEDMAN, *Primary Examiner.*

J. ADEE, *Assistant Examiner.*